May 18, 1943. H. KRONSTAD 2,319,548
KILN
Filed March 8, 1941 2 Sheets-Sheet 2
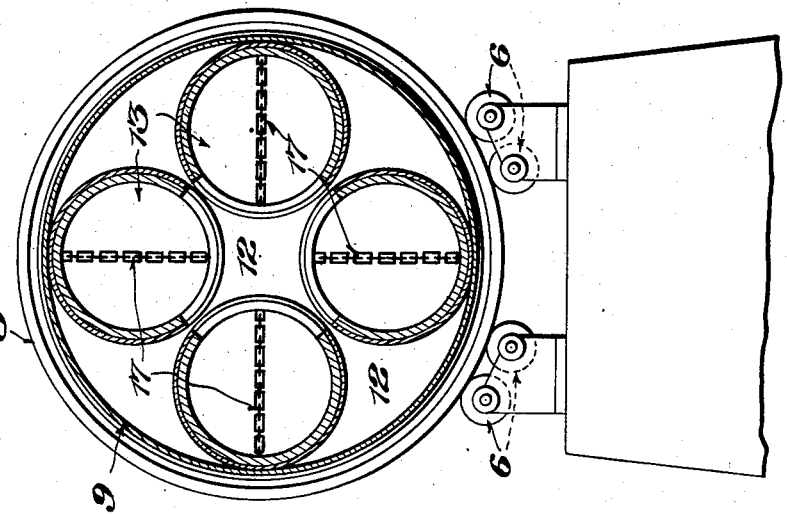
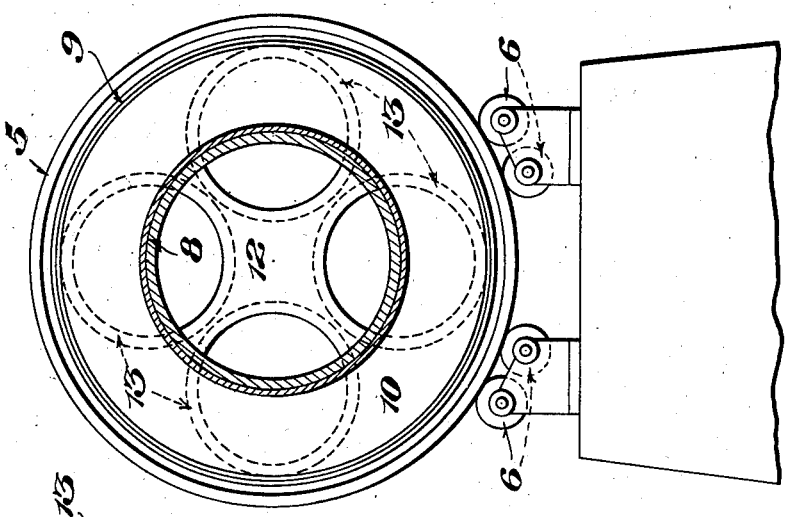
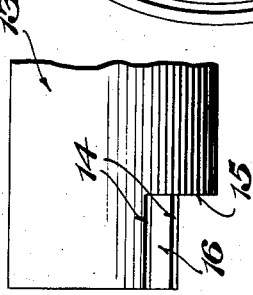
Inventor
Haavard Kronstad,
By Royal E. Burnham,
Attorney Patented May 18, 1943

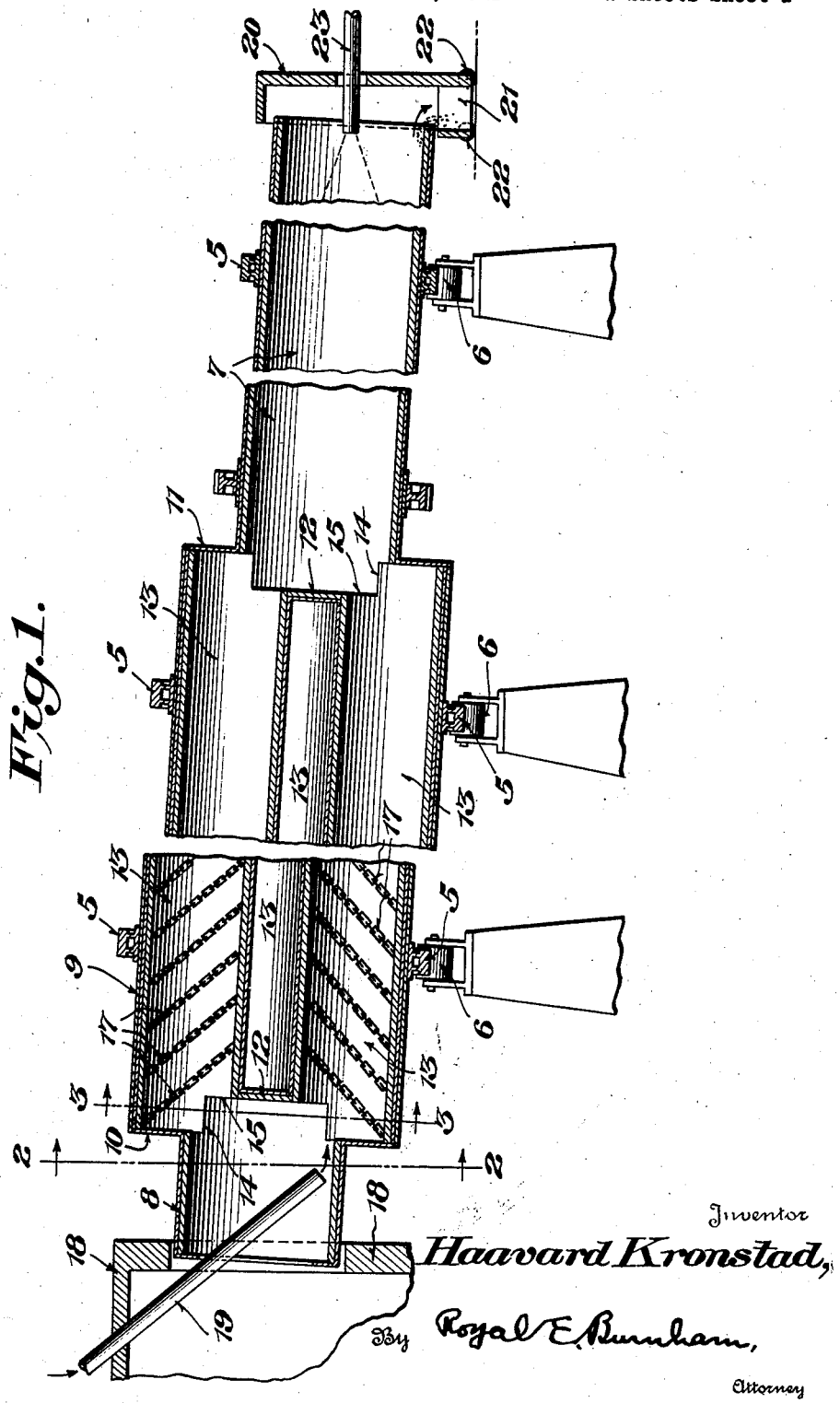

2,319,548

UNITED STATES PATENT OFFICE 2,319,548

KILN

Haavard Kronstad, near Mahoningtown, Pa.

Application March 8, 1941, Serial No. 382,437

4 Claims. (Cl. 263—32)

This invention relates to kilns and the like of the rotary slightly inclined type through which material under treatment works its way, under the influence of kiln inclination and rotation, from the upper feed end to the lower discharge end, the material being subjected directly to heat of a jet of burning fuel introduced at the lower end and moving countercurrent to the material until it leaves the upper end of the kiln. Material for making cement clinker is introduced into the upper end of the kiln usually in moist or wet condition.

It is an object of the invention to provide more efficient and thorough means than heretofore used for preliminary drying and scrubbing treatment of water containing raw material and for preheating it before it reaches the calcining zone of the kiln.

Another object of the invention is so to form and arrange parts of the kiln itself that they themselves feed material into the preliminary treating section, whereby use of special feeding mechanism is unnecessary.

When considered with the description herein, characteristics of the invention are apparent in the accompanying drawings, forming part hereof, wherein an embodiment adapted for production of cement clinker is disclosed for purpose of explanation.

Like reference-characters refer to corresponding parts in the views of the drawings, whereof—

Fig. 1 is a longitudinal vertical section of the kiln;

Fig. 2 is a section on line 2—2, Fig. 1;

Fig. 3 is a section on line 3—3, Fig. 1;

Fig. 4 is a fragmentary side view of one of the drum cylinders.

The kiln is provided with exterior bands or hoops 5 at suitable intervals of its length by which it is carried on rollers 6. The kiln is rotated by conventional drive means (not shown) at the proper speed. It is slightly inclined to the horizontal in order that material being treated will work its way during rotation of the kiln to the discharge end. Ordinarily, for production of cement clinker, only slight inclination is required.

The kiln includes an elongated hollow cylindrical lower section 7 containing a clinkering zone, a hollow cylindrical feed section 8 at its upper end, and a hollow cylindrical preheating, drying, and scrubbing drum 9 between and connected at its ends to the lower and feed sections.

The drum 9 is of greater diameter than the lower and feed sections. It has at one end a diametrically disposed ring-like wall 10 that extends from its peripheral wall inwardly to that of the feed section 8, and a similar wall 11 at the other end similarly disposed and connected to the lower section 7. Thus there is a continuous passage from the feed section through the drum and lower section.

Transverse partitions 12, one in each end portion of the drum at a place spaced inwardly from one of the end walls thereof, are connected to the peripheral wall of the drum.

A plurality of hollow cylinders 13 close to or tangential with the peripheral wall of the drum extend longitudinally therein between the partitions 12. They project outside of the partitions to the end walls of the drum, and inside of those ring-like end walls they open to the feed section 8 and the lower section 7. The drum is of greater diameter than the lower clinkering section of the kiln, and the cylinders therein are of greater total diameter than that of the lower kiln section, in order that hot gasses may move therethrough at less velocity than in the clinkering zone.

In order to enlarge the openings at the ends of the cylinders 13 and to provide scooping means at the feed end and dumping means at the discharge end, a segment of each end of each cylinder inside of the ring-like end walls of the drum is removed by cutting along the longitudinal lines 14 and the radial lines 15. Thus each cylinder 13 has at its feed end a scoop 16 beginning at an edge defined by a line 14. A forward portion of the scoop is seen, for example, in Fig. 4, which shows the upper cylinder of Fig. 1 as turned slightly away from the position it has in the latter figure. The intake ports formed as just described in the upper ends of the cylinders 13 open toward the axis of the kiln, and their scoop edges are disposed near the peripheral plane of the feed section.

Similar formation of the cylinders at the discharge end facilitates dumping of material therefrom into the lower section of the kiln.

Taut chains 17, connected to the walls of the cylinders 13, extend across the chambers thereof at an inclination to their axes. They function in preliminary treatment of material as later explained.

The feed section 8 opens at its outer end to a dust chamber, which may be of suitable conventional form and which is indicated fragmentarily by walls 18. Material to be treated is supplied to the feed section by an inclined feed conduit 19.

The lower end of the lower section 7 is closed by a firing hood 20, which has an outlet 21 in its bottom for discharge of treated material, and which is carried by rollers 22 or the like so that it may be removed from and replaced to normal position. The hood carries at its center a fuel burner 23 by which heat is supplied to the kiln.

All parts of the kiln that are subjected to high temperatures may be lined with fire brick or other suitable heat resisting material.

When the kiln is in rotating operation for production of cement clinker, for example, the raw material, known as slurry and containing some water, is supplied to the feed section through the conduit 19. The scoops at the feed ends of the cylinders 13 take up the material and cause it to enter the cylinders. The material then works through the cylinders. While in this zone of treatment, the material is subjected to action of hot gases discharged thereinto from the clinkering section and moving countercurrent to the material. It is dried, and also subjected to action to scrub out dust in the gases before they leave the kiln.

The chains 17 in the cylinders absorb heat from the gases, keep the material from becoming matted, and thus contribute to the drying and scrubbing of the material. Efficiency of their action in the material is enhanced by their inclination to the axes of the cylinders.

The material, as it passes from the lower ends of the cylinders, goes into the clinkering zone of the lower section of the kiln, through which it works its way and where it is subjected to final treatment of producing clinker, and from which it is discharged into the firing hood.

Ordinarily, the lower or clinkering section of the kiln is longer than the drum section, the length being dependent upon the nature of the material and the time required to bring it to the end point condition. The gases and products of combustion have high velocity in this section. From the clinkering zone they enter the multi-cylinders of the drum, where they have lower velocity due to the larger area of the cylinders, and where heat in the gases is used before going out of the kiln to the dust chamber. The transverse partitions in the drum prevent gases from the clinkering zone from entering the space in the drum outside of the cylinders, so that all of those gases enter the cylinders 13 in which they have direct action on the material.

Although operation of the apparatus of this invention has been described with reference to a kiln for production of cement clinker, it is to be understood that the invention and the claims thereto are not limited to the making of that product, as the invention is applicable to other apparatus for heat treatment of other material.

I claim:

1. A rotary inclined tubular kiln comprising a lower clinkering section, an upper feed section, a drying drum between and connected to said sections, a transverse partition in each end portion of said drum, hollow cylinders mounted in said partitions and projecting outside thereof, the projecting lower portions of said cylinders having openings to discharge to said clinkering section, and the projecting upper end portions of said cylinders having lateral intake ports open toward the axis of the kiln to the chamber of said feed section.

2. A rotary inclined tubular kiln comprising a lower clinkering section, an upper feed section, a drying drum between and connected to said sections, a transverse partition in each end portion of said drum, hollow cylinders mounted in said partitions and projecting outside thereof, the projecting lower portions of said cylinders having openings to discharge to said clinkering section, and the projecting upper end portions of said cylinders having lateral intake ports open toward the axis of the kiln to the chamber of said feed section, said intake ports having scoop edges disposed near the peripheral plane of the feed section.

3. A rotary inclined tubular kiln comprising, in combination, a drying drum, a transverse partition in each end portion of said drum, hollow cylinders mounted in said partitions and projecting outside thereof, a lower clinkering section and an upper feed section diametrically smaller than and having chambers extending into said drum, and ring-like end walls of said drum connected to said sections and closing the ends of said cylinders outside of said sections, the projecting lower end portions of said cylinders having openings to discharge to said clinkering section, and the projecting upper end portions of said cylinders having lateral intake ports open toward the axis of the kiln to the chamber of said feed section.

4. A rotary inclined tubular kiln comprising, in combination, a drying drum, a transverse partition in each end portion of said drum, hollow cylinders mounted in said partitions and projecting outside thereof, a lower clinkering section and an upper feed section diametrically smaller than and having chambers extending into said drum, and ring-like end walls of said drum connected to said sections and closing the ends of said cylinders outside of said sections, the projecting lower end portions of said cylinders having openings to discharge to said clinkering section, and the projecting upper end portions of said cylinders having lateral intake ports open toward the axis of the kiln to the chamber of said feed section, said intake ports having scoop edges disposed near the peripheral plane of said feed section.

HAAVARD KRONSTAD.